WILLIAM C. EBELING
INVENTOR.

HIS ATTORNEY

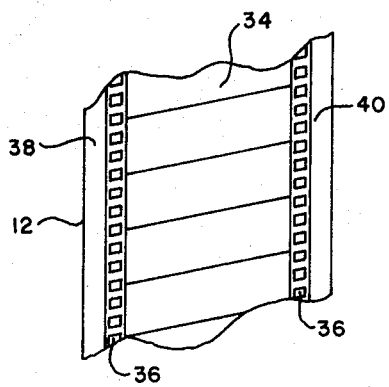
FIG. 3
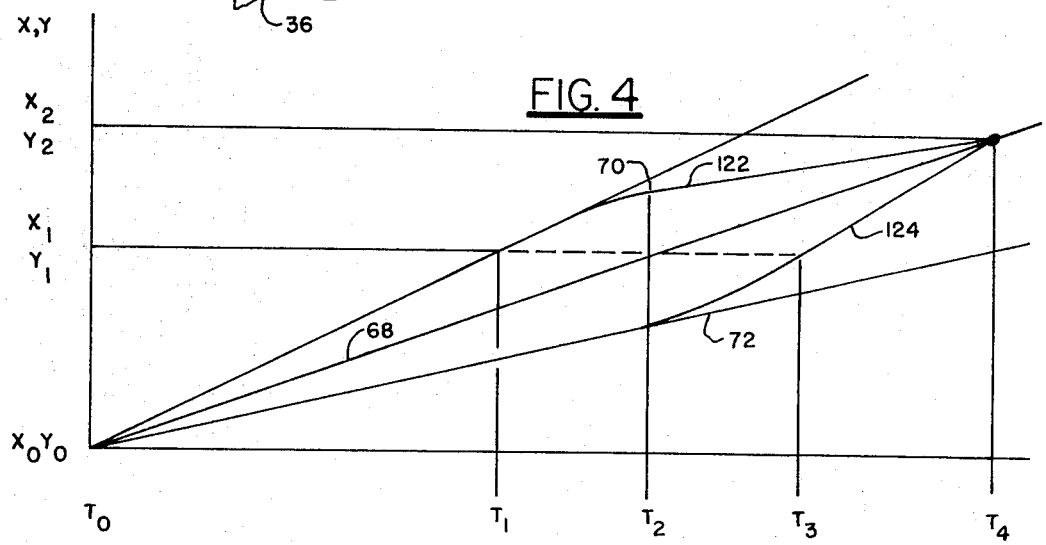
FIG. 4
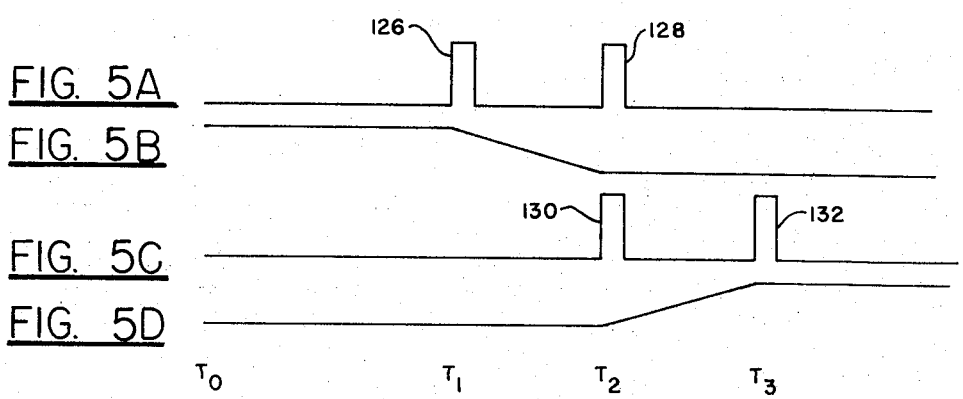
FIG. 5A
FIG. 5B
FIG. 5C
FIG. 5D

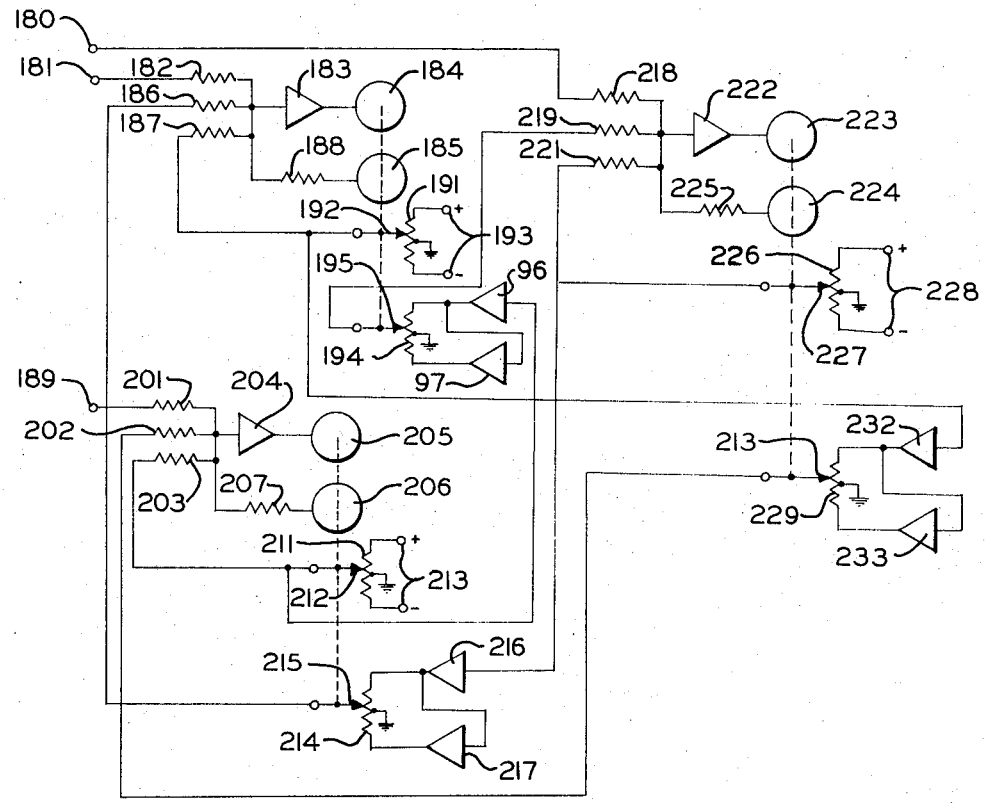

United States Patent Office 3,675,993
Patented July 11, 1972

3,675,993
VISUAL SYSTEM
William C. Ebeling, deceased, by Dorothy Stott Ebeling, executrix, 61 Buckboard Road, Wilton, Conn. 06897
Continuation-in-part of applications Ser. No. 757,656, Sept. 5, 1968, and Ser. No. 779,499, Nov. 27, 1968. This application Jan. 18, 1971, Ser. No. 106,952
Int. Cl. G03b 21/50; G09b 9/08
U.S. Cl. 352—92
13 Claims

ABSTRACT OF THE DISCLOSURE

A simplified visual system which is inexpensive and provides visual training aids for a general-purpose aviation trainer by using a motion picture projector to project upon a suitable display screen in clear view of the trainee motion pictures of aircraft landings and take-offs. The sound track of the motion picture containing information pertaining to the speed of the camera aircraft when the picture was made is read and used to control the projection speed of the film. In addition, the apparatus for initiating the projection of the film at the proper time, for halting the motion picture at the proper time and for rewinding the film is provided.

---

This is continuation-in-part of application Ser. No. 757,656, now abandoned, filed Sept. 5, 1968, and of application Ser. No. 779,499, now abandoned, filed Nov. 27, 1968. This invention relates to a display system suitable for use in vehicle simulators.

Optical systems for displaying environmental situations encountered during a simulated mission in a vehicle trainer are not new. In the past the most common system for such a display device has been projection television. A three-dimensional model of the environment to be displayed is first constructed. Then a television camera is mounted upon suitable supports with sufficient motion capabilities for the type of simulation being produced so that the camera can move over the model to simulate the travel of the vehicle, and move in such as manner as to simulate the motion of the vehicle. The electrical signals generated by the television camera are amplified and are applied to a projection cathode ray tube on the face of which the image of the model is recreated. This image is then projected onto a screen, often a rear-projection screen, which is placed before the trainee. As the trainee operates the controls of his simulated vehicle, the scene before him moves in the same manner that an actual scene would move. Usually the television camera is controlled by a computer which receives travel information from the camera carriage and vehicle operation.

This type of a display system has several serious disadvantages. For one, a television picture is not realistic. The raster produces lines whose presence becomes more apparent with the enlargement of the image produced by the projection. In addition, the non-uniformity of curvature of the screen and the variations in sweep rate of the cathode ray beam produce distortions around the edges of the picture. Further, the viewing resolution is not good since the three-dimensional model cannot contain much detail both because of its scale and its cost. Where a visual system is used with aircraft trainers simulating travel at 120 miles per hour, each minute of simulated flight must cover two miles of terrain. To produce a three-dimensional model sufficiently small to fit in a normal simulator room, the reduction must be quite large. This eliminates most details of the terrain and reduces both the resolution of the pickup and the plausibility of the resultant image.

In addition to the lack of resolution in the final image, the apparatus involved in the television-model system is very expensive. The model itself must be a masterpiece of contour map making in order to produce reasonably realistic images, the carriage and mounts for the television camera are expensive, the lens systems used on the camera are also expensive since they must enable the camera to get quite close to the model itself, sometimes as close as $3/16$ inch, and the control mechanism is also costly. For these as well as other similar reasons, the prior art systems for displaying the environmental conditions through which a simulated vehicle passes have been unsatisfactory.

Motion picture systems employed in combination with distortion optics form more effective visual systems for aircraft simulators and the like than do camera model systems. Generally a film is exposed by a camera which follows substantially the flight path intended to be simulated. The developed film is then projected through distortion optics onto a screen in front of the simulator and in the view of the operator. The distortion optics permit translational excursions within the plane of each recorded scene on the film. During display of the film, the speed of the film in relation to the projector optics determines the apparent speed of the simulator. Accordingly, it is necessary to maintain the speed of the motion picture film synchronized with the computed speed of the simulator. Difficulties arise, however, when the ground speed of the camera which originally exposed the film changes during a particular flight. This condition always occurs during an approach and landing wherein the speed of the aircraft must decrease substantially during the approach phase. Therefore, a need exists for a motion picture film drive which will maintain the projected scenes in registry with the computed range and speed of the simulator.

If a film is exposed at a frame rate proportional to the ground speed of the camera, the developed film during subsequent display thereof can be driven in accordance with the computed speed of the simulator. This is accomplished by employing a rate servomechanism to drive the film, which servomechanism is controlled in accordance with the computed ground speed of the simulator. However, rate servomechanisms are not sufficiently accurate to maintain proper registry between the scenes projected and displayed to the operator and the computed ground position of the simulator.

As a result, a large disparity may exist between the computed position of the simulator as determined by the operator's control thereof and the position which is visually presented by the motion picture projector and associated optics.

In addition, if the film is exposed at a rate proportional to the ground speed of the recording camera, objectionable flicker may occur in the subsequent display of such film. For example, if the film is being exposed at a rate of 24 frames per second during cruising speed of the airplane carrying the recording camera and reduced to a rate of 12 frames per second during the landing phase, and if the simulator is controlled to follow essentially the same flight path at the same speed, the landing phase displayed to the trainee will also be at a frame rate of 12 frames per second. If the simulator is controlled to make the landing phase at a slower speed, the frame rate will be reduced further from 12 frames per second. Such operating conditions will result in objectionable flicker in the display, particularly in that phase of the flight when high resolution is necessary and any flicker is more pronounced.

Accordingly, it is an object of the present invention to provide a film drive system which maintains proper registry between the computed position of a simulator and the visual position displayed by the visual system associated therewith.

Another object of the present invention is to provide a film drive system for a motion picture visual system in which flicker is substantially reduced or eliminated.

Still another object of the present invention is to provide a control system for a motion picture film drive which senses the disparity which may exist between the computed position of a simulator and the position which is visually presented by the motion picture projector and associated optics of the visual system of the simulator and provides a correction signal proportional to such disparity to the film drive system.

It is also an object of this invention to provide a new and improved display system.

It is another object of this invention to provide a new and improved, simplified display system for vehicle trainers It is a further object of this invention to provide a new and improved, inexpensive, simplified display system suitable for training purposes.

It is still another object of this invention to provide a new and improved, simplified visual system for use with simulated aircraft trainers for teaching techniques of landing and take-offs.

Other objects and advantages of this invention will become more apparent as the following description proceeds, which description should be considered together with the accompanying drawings in which:

FIG. 3 is a view in perspective of a portion of a strip of film having information recorded thereon, which information is sensed by the system illustrated in FIG. 2 to maintain control of the speed thereof;

FIG. 4 is a graph illustrating the cumulative error which may occur between the computed speed of a simulator and the speed of a film associated with the visual system of the simulator;

Figure 2:
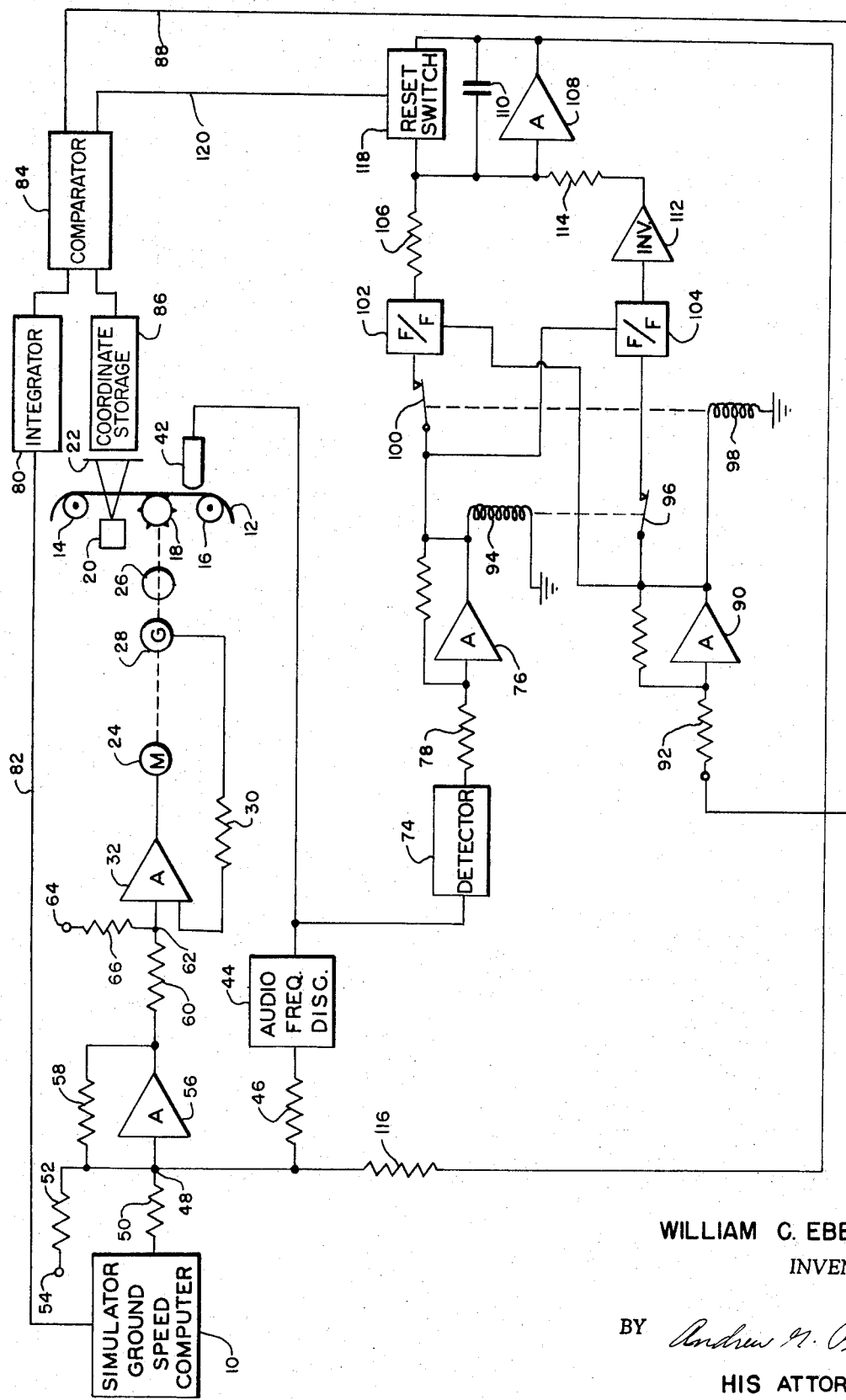
FIG. 2 is a partial schematic and partial block diagram of a film drive system constructed in accordance with the principles of the present invention.

FIGS. 5 A–D; graphically illustrate the cumulative position error and the associated correction signals generated by the system illustration FIG. 2.

Figure 1:
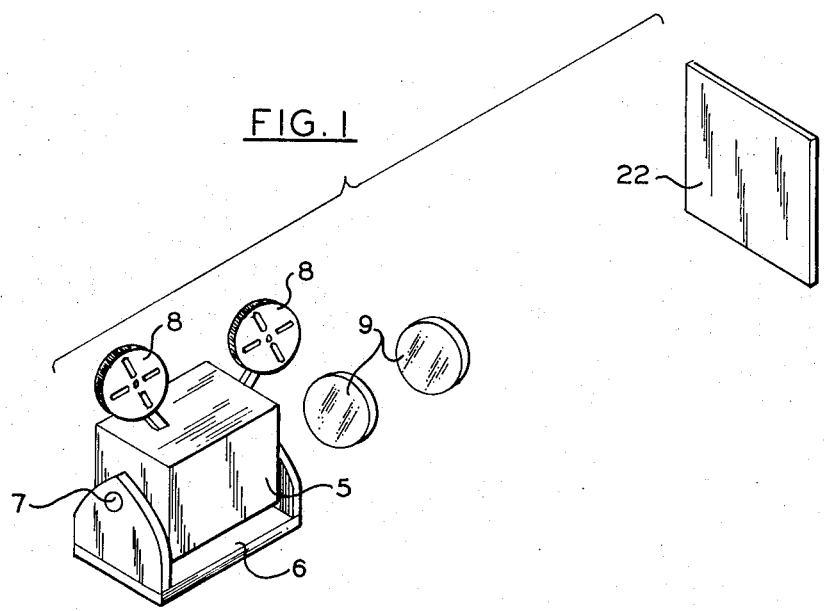
FIG. 1 is a sketchy pictorial illustration of the system 30 of this invention.
Figure 6:
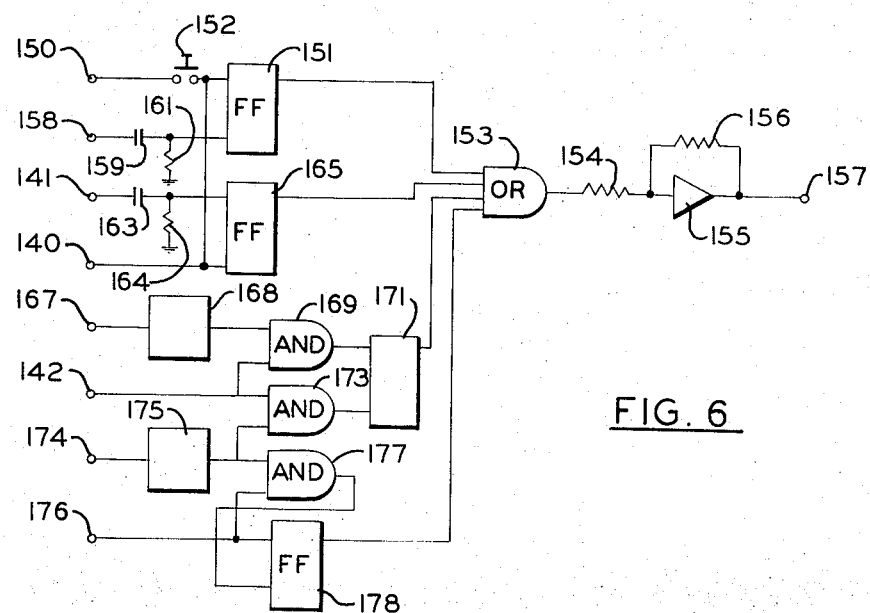

FIG. 6 is a detailed block diagram of the switching circuits of the system of this invention; and FIG. 7 is a block diagram of the circuits controlling the positioning of the projector shown in FIG. 1.

Visual systems for training devices should be as realistic as possible to present to the trainee a plausible view of a recognizable situation. In the past this has been difficult to achieve because of the high cost of visual systems. However, in many cases the system need not be a comprehensive device which tries to cover all visual situations. In fact, there are many trainers and training situations where limited visual capabilities are completely adequate. In a small general-purpose trainer, adequate visual training can often be achieved by utilizing the visual system only during very short periods of time. It is often more important to provide a trainee with training in instrument flying and the use of radio navigational aids during cross-country manuevers than it is to provide him with a scenic view of the geography over which he is passing. The system of this invention is designed to provide training facilities during limited periods of time—namely, during take-offs and during landings.

In the system of this invention it is assumed that the trainer utilizing this visual system will have a motion system which is capable of pitch, roll and yaw. However, the invention is not limited to any trainer or any combination of motions. In fact, this invention is useful with trainers having no motion whatsover. Referring to FIG. 1 in detail, the reference character designates a motion picture projector 5 pivotally mounted on a base 6 by means of a pivot 7. The projector 5 also includes two standard film reels 8 which supply and take-up the film as it passes through the projector. In addition to a standard projection lens (not shown in FIG. 1) two optical wedges 9 are shown along the optical axis of the projector 5. In order to avoid unnecessarily cluttering in the drawing, the mountings and drive means for the wedges 9 are not shown, but it as assumed that the two wedges 9 are supported suitably in the optical path of the projector 5 and so that they can be rotated as desired by appropriate servo motors. A screen 22 receives the image projected from the projector 5.

The system of FIG. 1 is provided for use with an aviation trainer having pitch, roll and yaw capabilities. The system will use a motion picture film which includes a sound track. The projector 5 is a variable speed projector which has means for reproducing information recorded on the second track and which may include a "zoom" lens remotely controlled. Since such motion picture projectors are conventional, no attempt has been made either to show the details of structure or to describe them. The projector 5 is mounted on a longitudinal axis 7 so that it can be pivoted to simulate roll of the aircraft. The image projected by the projector 5 passes through the two optical wedges 9 and appears on the screen 22, which may be a rear projection screen. The trainee must be in a position to view the screen 22 through the normal windshield of the simulated vehicle. The wedges 9 are independently mounted for rotation in any suitable rotary mount, and each is driven by its own servo motor. Since the details of the mounting and of the mechanical drive for the wedges 9 are immaterial to this invention, any such structures will be suitable and none have been shown or described.

The film which is mounted on the reels 8 contains, in several motion picture sequences, actual photographs, for example, of the appearance of a runway as an airplane comes in for a landing, as the airplane touches down, and as the airplane takes off. When the motion picture is made, there must be recorded on the sound track of the motion picture information designating the speed of the aircraft at every instant.

With reference to FIG. 2, there is shown a preferred embodiment of the film drive system which maintains exact registry between the position of a film and the computed position of a grounded simulator. A simulator ground speed computer 10 is responsive to actuation of controls within the simulator by an operator thereof to provide acceleration and velocity quantities along each of three coordinate axes at outputs thereof. Such a computer may be of the type disclosed by U.S. Pat. 2,925,667.

The film 12 of projector 11 in FIG. 1 is supported between a pair of rollers 14 and 16 and is driven by an intermittent sprocket 18. An illumination source, generally designated with the reference numeral 20, provides a source of light for illuminating the film and displaying scenes recorded thereon on to the screen 22. Distortion optics may be employed between the film and the screen for altering the apparent perspective of the image as shown in FIG. 1.

If the film 12 is driven at the same rate as the rate during exposure thereof, the scenes displayed on the screen 22 will provide an apparent sensation to the viewer of traveling at the same ground speed as the ground speed of the camera which exposed the film 12. If the film 12 is advanced at a higher rate by the sprocket 18 than the rate at which the film was exposed, a viewer will be provided with a sensation of traveling at a faster ground speed than the ground speed of the camera which exposed the film.

If the operator of the simulator is viewing the scenes displayed on the screen 22 while manipulating the controls of the simulator, the apparent position or viewpoint of the observer is determined by the particular scene being displayed on the screen 22. This visual viewpoint of the observer should correspond exactly to the computed position of the simulator, which position is determined by the actuation of the controls thereof by the operator. If proper registry is not maintained between the scenes displayed on the screen 22 and the position of the simulator, the training value of the simulator and visual system associated therewith will not be satisfactory. For instance, if the computed position of the simulator is at an altitude of 50 feet, which position will be indicated by the dials within the cockpit and observed by the trainee pilot, and the viewpoint of the scenes displayed on the screen 22 and observed by the trainee pilot has an altitude of 20 feet, a considerable amount of confusion will result which will impair the training value of the system.

Accordingly, the present invention provides a system which maintains proper registry between the scenes displayed on the screen 22, and the apparent visual viewpoint of the trainee pilot, and the computed position of the simulator as defined by the actuation of the simulator controls by the trainee pilot.

The intermittent sprocket 18 is driven by means of a motor 24 connected through an intermittent drive, indicated schematically by the block designated with the reference numeral 26. A tachometer-generator 28 is connected to the output shaft of the motor 24 and provides a voltage proportional to the speed of the shaft through a resistor 30 to the input of an amplifier 32. The other input of the amplifier 32 is provided with a signal corresponding to the desired speed of the film 12. The amplifier 32 amplifies the difference between the signals applied to the two inputs thereof and drives the motor 24 in accordance with such difference. The combination of the amplifier 32, motor 24, generator 28, and resistor 30 will be recognized as a rate servomechanism for controlling the speed of the film 12. It is well known that a rate servomechanism may have a certain amount of positional drift with the passage of time. As a result of this problem, the position of the apparent viewpoint of a scene being projected from the film 12 may not correspond with the computed position of the simulator.

As previously mentioned, a second problem encountered in using only a rate servomechanism for driving the film 12 is that of objectionable flicker which will occur in the display presented to the operator of the simulator. If a rate servomechanism is employed as the sole control means in the film drive system, the film 12 must have been exposed at a film rate which is proportional to the ground speed of the recording camera. Under such conditions during subsequent display of the film, the film 12 must also be driven at a rate proportional to the computed velocity of the simulator. Since a large variation exists between the speed of an aircraft during the various phases of flight thereof, the frame rate of the film 12 must also vary accordingly which will result in objectionable flicker in the final display presented to the operator of the simulator.

In order to overcome the two above described problems, the present invention contemplates exposing the film at a constant frame rate which is not dependent upon the ground speed of the recording camera, recording a signal corresponding to the ground speed of the recording camera, and providing a second feedback loop in the film drive system which includes the rate servomechanism, which second feedback loop is responsive to the recorded ground speed signal to provide a correction signal which is combined with a constant amplitude signal corresponding to the constant frame rate of the film during exposure and supplying such combined signals to the input of the rate servomechanism. Since the signal which corresponds to the ground speed of the recording camera must correspond with the scenes recorded on the film 12, such a signal is recorded directly on the film 12 during exposure thereof.

As shown in FIG. 3, the film 12 has a plurality of frames 34 recorded thereon and is provided with sprocket holes 36 at opposite edges thereof which are engageable by the sprocket wheel 18 for driving the film. A pair of magnetic strips 38 and 40 are provided at opposite edges of the film 12. During exposure of the film 12, a signal proportional to the ground speed of the recording camera is recorded on one or both of the recording strips 38 and 40. The frequency of the recorded signal is modulated in accordance with the instantaneous ground speed of the recording camera and is recorded simultaneously with the exposure of the film. A magnetic readhead 42 (see FIG. 2) is positioned to sense the signal recorded on one of the magnetic strips 38 and 40 which contains the recorded signal corresponding to the ground speed of the recording camera. The signal from the readhead 42 is supplied to an audio frequency discriminator 44 which produces a DC signal having an amplitude corresponding to the frequency of the signal recorded on the film 12. The output of the audio frequency discriminator 44 is supplied through a resistor 46 to a summing junction 48. A signal corresponding to the computed ground speed of the simulator is supplied by the computer 10 through a resistor 50 to the summing junction 48. In addition, a constant amplitude voltage is supplied through a resistor 52 from a terminal 54 to the summing junction 48. The summing junction 48 forms an input to an amplifier 56 having a feedback path formed by a resistor 58. As will be described in greater detail hereinbelow, the constant amplitude voltage supplied at the terminal 54 is proportional to a frequency which corresponds to zero ground speed of the recording camera. An output of the amplifier 56 is supplied through a resistor 60 to a summing junction 62 which forms an input to the amplifier 32. A constant voltage signal is supplied to a terminal 64 which is connected through a resistor 66 to the summing junction 62. The constant voltage signal on the terminal 64 corresponds to the constant frame rate of the film 12 during exposure thereof. Logic to control this signal is described in connection with FIG. 6.

If the envelope of the computed speed of the simulator through the approach, landing, and landing roll phases is considered, variations in this envelope from one simulated flight to another simulated flight will be relatively minor. Therefore, if the film 12 is exposed at a constant frame rate, for example 24 frames per second, during a typical approach, landing, and landing roll, any variation of the film speed for a particulad simulated flight will not be sufficient to cause objectionable flicker in the display presented to the operator of the simulator.

The signal recorded on the film 12 is frequency modulated in accordance with the ground speed of the recording camera. This signal is detected by the readhead 42 and converted to a DC signal by the discriminator 44 so that correction from the recording frame rate can be made as the simulated ground speed varies from that contained in the film recording. Therefore, the readhead 42, discriminator 44 and amplifier 56 form a second feedback loop which provide a correction signal to the rate servo-mechanism which includes the amplifier 32. The correction signal, $\Delta r$ is defined by Equation 1.

(1) $$r = R + \Delta r$$

Where $r$ is the instantaneous speed of the film 12 during a simulated flight mission in frames per second and R is the constant speed of film 12 during exposure thereof in frames per second.

Since the playback speed is not constant, variations caused by the computed ground speed variations of the simulator will cause a frequency shift defined by Equation 2.

(2) $$f = \frac{R + \Delta r}{R} f_R$$

Where $f$ is the frequency of the signal from the output of the readhead 42 and $f_R$ is the frequency of the signal recorded on the film 12 at the constant exposure frame rate. This latter frequency is defined by Equatiton 3.

(3) $$f_R = K V_R + f_0$$

Where $f_0$ is the frequency of the signal recorded on the film 12 corresponding to zero ground speed, $V_R$ is the instantaneous ground speed of the camera and K is a constant of proportionality.

The desired speed of the film 12 during playback for any particular situation is defined by Equation 4.

(4)
$$r = \frac{RV_G}{V_R}$$

Where $V_G$ is the ground speed signal obtained from the computer 10. From these four equations, the expression $\Delta r$ can be derived which indicates the speed correction required for any situation. This expression is defined by Equation 5.

(5)
$$\Delta r = \frac{R}{f_0}(f - KV_G - f_0)$$

Although the frequency of the signal recorded on the film 12 is equal to $f_R$, the frequency of the signal at the output of the readhead 42 will be equal to $f$. Consequently, the DC signal at the output of the discriminator 44 will be proportional to the frequency $f$. As previously stated, a signal proportional to the computed ground speed of the simulator is supplied from the computer 10 to the summing junction 48 and a signal proportional to the frequency corresponding to zero ground speed of the camera is supplied from the terminal 54 to the summing junction 48. The amplifier 56 multiplies the signals combined at the summing junction 48 by a factor of $R/f_0$ as required by Equation 5. Therefore, the output of the amplifier 56 supplied to the summing junction 62 is equal to $\Delta r$. This correction signal is summed with a DC signal equal to R which is supplied to the summing junction 62 from the terminal 64.

By the above described apparatus, the two problems are eliminated. The problem of position drift with the passage of time in a rate servomechanism is eliminated by the provision of a second feedback loop which includes the readhead 42 and discriminator 44. By the above described arrangement, any position drift which may result will be immediately sensed and a correction signal will be provided at the input of the rate servomechanism to maintain proper registry between the scenes being displayed and the computed position of the simulator. In addition, the above described arrangement eliminates objectionable flicker which would result if the film 12 is driven solely by a rate servomechanism. As described hereinabove, this problem is obviated by exposing the film 12 at a constant frame rate, rather than at a frame rate which is proportional to the ground speed of the recording camera and recording a signal on the film 12 which is proportional to the ground speed of the recording camera and employing such a signal in a second feedback loop to the rate servomechanism.

Although a considerable amount of possible error is eliminated by the second feedback loop, a small error may result since there is no synchronizing means in the above described system. Since this error is a cumulative error, it will be most pronounced at the end of a particular flight mission where it is least desired. A disparity between the computed position of the simulator and the apparent viewpoint of the displayed scenes at the beginning of a flight mission, such as at the beginning of an approach to a landing strip, is not as noticeable as such a disparity at the end of a flight mission, such as during the landing phase.

FIG. 4 is a graph illustrating the disparity which may exist between the computed position of the simulator and the apparent viewpoint of the scenes displayed to the operator of the simulator. As shown in FIG. 4 position coordinates are represented on the ordinate and time is represented on the abscissa. A line 68 represents the computed position with respect to time of a simulator as determined by the operation of the controls thereof by an operator. Although the line 68 is shown as a straight line for purposes of simplicity, in actual practice it will be curved. The coordinates $x_0$ and $y_0$ represent the beginning of a simulated flight mission, such as the outer marker in a simulated approach to an airport. The coordinates $x_1$ and $y_1$ represent the position of the middle marker with respect to a particular airport and the coordinates $x_2$ and $y_2$ represent the end of a particular simulated flight mission. As shown in FIG. 4, the computed position of the simulator crosses the middle marker at a time $t_2$ and completes the mission at a time $t_4$. The straight line 70 represents the apparent viewpoint of the scenes being displayed from the film 12 with respect to time with an error in the drive system for the film. Since the film 12 is started at time $t_0$ and begins with scenes having an apparent viewpoint located at the coordinates $x_0$ and $y_0$, the line path 70 passes through the origin of the graph. However, because of the error in the film drive system, a particular scene having a viewpoint located at the middle marker $(x_1, y_1)$ will be presented to the operator of the simulator at a time $t_1$. Under such conditions, the operator of the simulator will appear to have reached the middle marker before the computed position of the simulator. The opposite situation may also exist where the computed position of the simulator is at the middle marker before the viewpoint of the scenes displayed from the film 12. Such a condition is represented by the straight line designated by the reference numeral 72. As shown in FIG. 4, the line 72 intersects the middle marker coordinates $(x_1, y_1)$ at a time $t_3$. It can readily be appreciated that the positional errors which are represented in FIG. 4 will impair the training value of the simulator and associated visual system. Atlhough the operator of the simulator may not be able to recognize the error which may exist at the coordinates of the middle marker during the simulated flight, such error will become more apparent as the flight mission progresses toward a landing. As shown in FIG. 4, the error continues to increase as the flight mission progresses. Therefore, in order to provide a realistic display to an operator of a simulator, it is necessary to correct the positional error between the viewpoint of scenes displayed to the operator and computed position of the simulator.

Accordingly, the present invention senses the disparity between the viewpoint of the scenes displayed to the operator of the simulator and the position of the simulator and provides a correction signal to the film drive system in accordance with such disparity. In order to sense this disparity, the signal recorded on one of the magnetic strips 38, 40 representing the ground speed of the camera is amplitude modulated at a point representing the middle marker in the simulated flight mission. This amplitude modulation is sensed by the readhead 42 and supplied to a detector 74 which delivers a pulse at an output thereof upon receipt of the amplitude modulated signal at the input thereof. The pulse is supplied to the input of an amplifier 76 through a resistor 78. In addition, the computed velocity components of the simulator are supplied from the computer 10 to an integrator 80 by means of a cable 82. These velocity components are integrated and supplied to a comparator 84 which is connected to a coordinate storage 86. When the computed position of the simulator passes the middle marker $(x_1, y_1)$ the comparator 84 provides an output pulse on a line 88 to the input of an implifier 90 through a resistor 92.

The output of the amplifier 76 is connected to a relay coil 94 having a switch contact 96. In addition, the output of the amplifier 90 is connected to a relay coil 98 having a switch contact 100. The output of the amplifier 76 is connected through the switch contact 100 to the "set" input of a flip flop 102 and the output of the amplifier 90 is connected through the switch contact 96 to the "set" input of the flip flop 104. In addition, the output of the amplifier 76 is connected to the "reset" input of the flip flop 104 and output of the amplifier 90 is connected to the "reset" input of the flip flop 102. The output of the flip flop 102 is connected through a resistor 106 to the input of an integrator circuit formed by an amplifier 108 having a capacitor 110 in a feedback path. The output of the flip flop 104 is connected through an inverter 112 and a resistor 114 to the input of the integrator formed by the amplifier 108 and capacitor 110.

Preferably the relays 94 and 98 are of the latching type to remain actuated after an initial pulse is supplied thereto and until reset at a later time. However, it is to be understood that such latching function can also be accomplished by special purpose amplifiers for the amplifiers 76 and 90. If a pulse is received at the input of the amplifier 76 before a pulse is supplied to the amplifier 90, the relay 94 will be actuated to open the switch contact 96 and the flip flop 102 will be "set" to provide an output through the resistor 106 to the input of the integrator formed by the amplifier 108 and the capacitor 110. A subsequent pulse delivered to the input of the amplifier 90 will "reset" the flip flop 102. Between the "set" and "reset" times of the flip flop 102, the output of the amplifier 108 will be a negatively increasing signal. The output of the amplifier 108 will remain at the same positive voltage level upon "resetting" of the flip flop 102 until the capacitor 110 has discharged. The output of the amplifier 108 which forms a correction signal for the film drive system is supplied through a resistor 116 to the summing junction 48.

If a pulse is delivered to the amplifier 90 before a pulse is delivered to the amplifier 76, the relay switch contact 100 will open and the relay switch contact 96 will remain closed so as to permit the flip flop 104 to become "set." A subsequent pulse applied to the amplifier 76 will "reset" the flip flop 104. Between the "set" and "reset" times of the flip flop 104, a negative signal will be supplied to the integrator formed by the amplifier 108 and the capacitor 110 to provide a positive going pulse at the output thereof to the summing junction 48. Again, the output of the amplifier 108 will remain at the same level as that attained immediately prior to "resetting" of the flip flop 104 until the capacitor 110 is discharged. A reset switch 118 is connected in parallel with the capacitor 110 to permit discharging thereof. The reset switch 118 is connected to an output of the comparator 84 by means of a line 120. The comparator 84 delivers an output to the line 120 when the computed coordinates of the simulator coincide with the coordinates of the outer marker ($x_0$, $y_0$).

If a pulse is delivered to the amplifier 76 before a pulse is delivered to the amplifier 90, a negative correction signal will be supplied to the summing junction 48 to reduce the speed of the film drive system. On the other hand, if a pulse is delivered to the amplifier 90 before a pulse is delivered to the amplifier 76, a positive going pulse will be supplied to the summing junction 48 to increase the speed of the film drive system. The results of these two correction signals are illustrated graphically in FIG. 4 by the lines 122 and 124. The line 70 represents the condition of having the film 12 driven at a raster rate than the computed velocity of the simulator. Under such conditions, a pulse will be supplied to the amplifier 76 at a time $t_1$ and a pulse will be supplied to the amplifier 90 at a time $t_2$. The resultant correction signal will decrease the speed of the film 12 such that the line 122 intersects the line 68 at the coordinates $x_2$ and $y_2$ and at a time $t_4$. The line 72 represents the condition of the film 12 being driven at a slower rate than the computed velocity of the simulator. Under such conditions, a pulse will be supplied to the amplifier 90 at a time $t_2$ and a pulse will be supplied to the amplifier 76 at a time $t_3$. The resultant correction signal will increase the speed of the film 12 so that the line 124 will intersect the line 68 at the coordinates $x_2$ and $y_2$ and at a time $t_4$.

FIG. 5A is a graph of the relative positions of the pulses supplied to the amplifiers 76 and 90 under the conditions represented by the line 70 and FIG. 4. A pulse 126 is supplied by the detector 76 to the amplifier 76 at a time $t_1$ and a pulse 128 is supplied from the comparator 84 to the amplifier 90 at a time $t_2$. FIG. 5B illustrates a waveform of the signal at the output of the amplifier 108 under such conditions. FIG. 5C graphically illustrates the relative time positions of the pulses supplied to the respective amplifiers 76 and 90 under the conditions represented by the line 72 in FIG. 4. A pulse 130 is supplied from the comparator 84 to the amplifier 90 at a time $t_2$ and a pulse 132 is supplied from the detector 74 to the amplifier 76 at a time $t_3$. FIG. 5D illustrates a waveform of the signal at the output of the amplifier 108 under the conditions represented by the lines 72 and 124 in FIG. 4.

It can readily be appreciated that the above described method and apparatus for driving the film 12 solves several problems. By exposing the film 12 at a constant frame rate and employing a second feedback loop in combination with a rate servomechanism, objectionable flicker is eliminated and considerable amount of error inherent in rate servomechanisms is eliminated. By the use of comparison and logic circuitry for sensing the disparity between the coordinates of the viewpoint of the scenes presented to the operator of the simulator and the computed coordinates of the simulator, a correction signal can be supplied to the film drive system which completely eliminates such disparity.

FIG. 6 shows a portion of computer 10 which controls the starting and stopping of the film drive.

An input terminal 150 is connected to a source of electrical energy (not shown) to apply that energy to a reset switch 152 which is connected to one side of a flip flop 151 and to one side of a flip flop 165. The output of one side of the flip flop 151 is connected to one input of an OR gate 153, the output of which is applied through a resistor 154 to an input of an amplifier 155. A resistor 156 provides a feedback around the amplifier 155 whose output at output terminal 157 is the potential which provides the datum film speed to junction 64 of FIG. 2. An output of the frequency discriminator 44 of FIG. 2 is applied to an input terminal 158 and through a capacitor 159 which is connected across a resistor 161 to ground to apply an input signal to the other side of the flip flop 151. A second input to the first side of flip flop 165 is provided from terminal 140. The second input of the flip flop 165 has applied to it the outer marker signal which is applied to an input terminal 141 and through a capacitor 163 which is connected across a resistor 164 to ground. The output of the flip flop 165 is applied as a second input to the OR gate 153. The simulated aircraft ground speed is derived from the other portions of computer 10 of FIG. 2 and is applied to an input terminal 67 which is connected to the input of a Schmitt trigger 168. The output of the trigger 168 is connected as one input to a coincidence gate 169 whose output serves as one input of another flip flop 171. A take-off/landing signal, actuated by the instructor is applied to an input terminal 142, and serves as a second input to the AND gate 169 and a first input to another AND gate 173. Information coming from the sound track of the film 12 of FIG. 2 is applied to an input terminal 174 which is connected to the input of another Schmitt trigger 175. The output of the trigger 175 serves as a second input to the AND gate 173 and as a first input to another AND gate 177. The output of the AND gate 173 serves as the second input to the flip flop 171 whose output is connected to the input of the OR gate 153. A film rewind signal can be applied to an input terminal 176 which serves as one input to a flip flop 178 and also as a second input to the AND gate 177. The output of the AND gate 177 serves as the second input to the flip flop 178 whose output is connected as the fourth input to the OR gate 153.

In operation, these circuits serve to control the output to amplifier 155 to ultimately apply a signal of the correct amplitude and direction to the motor 24 of FIG. 2. Assume that a film has just been loaded on the projector 5 and that the film contains several approach and take-off sequences. To initiate operation of the system, the reset button 152 is pushed, applying a set pulse to the flip flop 151 and a reset pulse to flip flop 165. This sets flip flop 151 which applies a pulse through the OR gate 153 to the input of the amplifier 155. The output of the amplifier 155 is a reference signal which is applied to the input 64 (in FIG. 2) to ultimately drive motor 24. The film is then driven through the clear Mylar leader until the recorded sound track is reached. When the movement of the film drives the recorded sound track past pick up 42 a signal is generated which is applied through the frequency discriminator 44 (of FIG. 2) to the input terminal 158 (of FIG. 3) to reset the flip flop 151. This removes the signal from the amplifier 155 and the motor drive 24 stops. The projector is now in condition to display its first film sequence.

Each film sequence which shows an approach is so edited that it begins when the camera airplane reaches the outer marker. Therefore, when the simulated mission reaches the outer marker, the outer marker signal is applied to the input terminal 141 to set the flip flop 165. This applies a signal through the OR gate 153 to the amplifier 155, and the reference signal is generated and applied to the motor 24 to again initiate the forward movement of the film. At this point the computer 10 will commence to output a velocity signal to resistor 50 of FIG. 2. Speed control is generated by this and the signals recorded on the sound track and picked up as explained above in connection with the description of FIG. 2. Thus, as the simulated approach and landing is flown, variations in the speed of the simulated aircraft from the speed of the camera aircraft produce signal which cause changes in the film speed. This continues until the simulated aircraft has landed. When the simulated aircraft speed reaches zero upon landing, an input will be provided to terminal 140 to reset flip flop 165 and the film will stop. To reset the film for the next film sequence, which will be a take-off sequence, the reset button 152 is again depressed applying a pulse to set the flip flop 151 and cause the film to move to its next sound recording position.

When the take-off sequence is performed, a take-off signal is applied to the input terminal 42 and thereby to the gates 169 and 173. The signal applied to the input terminal 142 can be generated by an external flip flop, switch, or the like usually provided for the instructor. This applies a continuing signal to the AND gate 169, and when the speed of the simulated aircraft engine begins to increase for take-off operation, a potential appears at the input terminal 167 to set the Schmitt trigger 168. The AND gate 169 then passed a pulse to the flip flop 171 to set that flip flop and provide the amplifier 155 with an input signal. A reference output signal is then applied to the motor 24 to cause the film to move forward. At the beginning of each take-off sequence on film, a short burst of recorded sound is provided. The take-off sequence on film begins at the point where the camera aircraft begins to move forward, so that with the camera operating at 24 frames per second; the motion of the aircraft begins slowly and gradually increases. This is the same situation which is to be duplicated in the simulated mission so that, again, the sound track recorded on the film can serve as a film speed reference. As the speed of the simulated aircraft deviates from that of the camera aircraft, the variations in the signal from the sound track will modify the speed of the film appropriately. At the end of the take-off sequence when the simulated aircraft is flying at a suitable altitude and there is no more runway visible for the trainee, the film itself ends and a piece of transparent film is interposed before the beginning of the next sequence. The transition from the sound track to the transparent portion of the film produces a signal which is applied to the input terminal 174 to set the Schmitt trigger 175. This applies a second signal to the input of gate 173 which causes the flip flop 171 to be reset. All signals are then removed from the amplifier 155 and the film motor 24 stops. Indexing the film to the beginning of the next landing sequence is again initiated by depressing the reset button 152, and the operation is the same as has been described above.

To rewind the film, a reversing switch may be installed between motor 24 and amplifier 32 of FIG. 2. Although only one line is shown on the figure there will in actuality be a second ground return line to the motor. The reversing switch when thrown will then cause the output of amplifier 32 to be applied to what is normally the ground terminal of motor 24 and the ground to the terminal which is normally connected to amplifier 32. With this switch thrown, a signal is applied to the input terminal 176 of FIG. 6. This sets the flip flop 178 and applies a signal through the gate 153 to the amplifier 155 to energize the motor 24. The motor 24 then rotates in the opposite direction to rewind the film. When the beginning of the film is reached, the transition from the sound track to the transparent leader generates a pulse which is applied to terminal 174 to set the Schmitt trigger 175. This applies one input to an AND gate 177 and the other input to the AND gate 177 is provided by the rewind signal on terminal 176. The output of the gate 177 is applied to the flip flop 178 to reset that flip flop, remove the signal from the amplifier 155, and cause the motor 24 to stop.

Referring back to FIG. 1, the two wedges 9 provided to distort the image projected by the projector 5 onto the screen 22 so as to give the image on the screen 22 the same perspective that the scene would have to the trainee when the actual aircraft pitches or rolls. The achromatic wedges 9 are so positioned in the path of the image generated in the projector 5 that as they are rotated, they produce an apparent movement and a prescribed distortion of that image. As mentioned above, the two wedges 9 are mounted in suitable supports so that they may be readily rotated by servo motors in any suitable manner. The servo motors, not shown, are controlled by signals generated in the circuit shown in FIG. 7. In addition, the projector 5 is pivotally mounted on the base 6 by means of the pivots 7. Under normal circumstances, the projector 5 would hang in a true vertical position. However, when the simulated aircraft rolls, a third servo rotates the projector 5 through a desired angle so that the image on the screen 22 appears to rotate in the direction opposite to that in which the simulated aircraft is supposed to roll.

Referring to FIG. 7, information from the flight computer 10 proportional to the simulated roll of the trainer is applied to an input terminal 180 and through a resistor 218 to the input of an amplifier 222, the output of which energizes a motor 223. The output of the motor 223 is mechanically connected to a tachometer 224 which supplies an electrical signal through a resistor 225 to the input of the amplifier 222. The motor 223 is also mechanically connected to the slide 227 of a potentiometer 226 and to a slide 231 of a potentiometer 229. The potentiometer 226 has a center tap which is grounded, and its two extreme terminals 228 are connected to a source of electrical potential. The center tap of the potentiometer 229 is also grounded, and its two ends are connected to the outputs of amplifiers 232 and 233. The output of amplifier 232 is applied to the input of amplifier 233, providing both ends of the potentiometer 229 with the same signal, but 180 degrees out of phase. The heading input of the simulated aircraft is applied from the flight computer 10 to the input terminal 181 and through a resistor 182 to the summation input of an amplifier 183. The output of the amplifier 183 energizes a motor 184 which is mechanically connected to a tachometer 185 whose electrical output is applied through a resistor 188 to the input of the amplifier 183. In addition, the output of the motor 184 is mechanically connected to the slide 192 of a potentiometer 191 and to a slide 195 of a potentiometer 194. The potentiometer 191 is center tapped, and the center tap is grounded. A source of direct potential is applied to the two terminals 193 of the potentiometer 191. Similarly, the potentiometer 194 is also center tapped, and its center tap is also grounded. An amplifier 196 is connected to one side of the potentiometer 194, and an amplifier 197 is connected to the other side of the potentiometer 194; the output of the amplifier 196 is also applied as the input to the amplifier 197. The pitch output of the flight computer 10 is applied to the input terminal 189 and, through a resistor 201, to the input of the amplifier 204. The output of the amplifier 204 energizes a motor 205 which is mechanically connected to a tachometer 206 whose electrical output is applied through a resistor 207 to the input of the amplifier 204. The motor 205 is also mechanically connected to the slide 212 of a center tap potentiometer 211 and to the slide 215 of the center tap potentiometer 214. Both center taps are grounded. The two ends of the potentiometer 211 are connected by means of terminals 213 to a source of direct potential, and the two ends of the potentiometer 214 are connected to the outputs of amplifiers 216 and 217. The output of the amplifier 216 serves as the input to amplifier 217, assuring that the signals applied across the potentiometer 214 are 180 degrees out of phase. The slide contact 227 of the potentiometer 226 is connected through a resistor 221 to the input of amplifier 222 and is also applied directly as the input to amplifier 216. In addition, the slide contact 231 of the potentiometer 229 is connected through a resistor 202 to the input of the amplifier 204. The slide contact 192 of the potentiometer 191 is connected through a resistor 187 to the input of the amplifier 183 and is also connected to the input of the amplifier 232. The slide contact 195 of the potentiometer 194 is connected through a resistor 219 to the input of amplifier 222. The slide contact 212 of the potentiometer 211 is connected through a resistor 203 to the input of amplifier 204 and is also connected to the input of amplifier 196. The slide contact 215 of the potentiometer 214 is connected through a resistor 186 to the input of the amplifier 183.

Referring back to FIG. 1, the image projected on the screen is the view as seen from the camera aircraft. If the simulated aircraft approaches the runway, for example, at an angle different from that of the camera aircraft, or if the initial approach is the same as that of the camera aircraft but there is a deviation in heading, in pitch or in roll, the view presented to the trainee should conform. The photographic images on the motion picture film are fixed—they cannot be changed. But the image projected from that film can be modified so that what the trainee sees appears plausible to him under the conditions which exist at the time. If the simulated aircraft rolls, energization of a servo motor connected to the projector 5 to rotate that projector slightly on the screen 22 to produce an effect similar to that which the trainee would have in a real aircraft. His horizon tilts. Should the simulated aircraft pitch, then the servo motor connected to rotate one of the wedges 9 would operate to rotate that wedge. Since the wedge is thicker in one portion than in another, the image passing therethrough is distorted or bent more on one side than on the other. Rotating the wedge 9 causes the projected image on the screen 22 to move vertically. Similarly, as the simulated aircraft changes its heading, the other wedge 9 is rotated by its associated servo motor and that rotation causes the image on the screen 22 to move laterally.

In FIG. 7 the motor 223 is the roll motor, the motor 205 is the pitch motor, and the motor 184 is the heading motor. The operation of each motor depends upon a combination or summation of a plurality of inputs. Each motor amplifier has four input signals applied to it. One input is from its own tachometer, and this creates a closed loop system which is quite stable. A second input is from one of the potentiometers connected to the motor, a third input is from a potentiometer connected to the other motors whose movements modify this axis, and the fourth input is the appropriate input signal from the flight computer 10. Consider, for this example, the heading motor 184. Servo motor 184 is energized by the output of the amplifier 183 and the amount, speed and direction of rotation are all dependent upon the output of the amplifier 183. The phasing or polarity of the output from the amplifier 183 determines the direction in which the motor 184 rotates, and the existence or nonexistence of an output signal from the amplifier 183 determines whether or not the motor 184 rotates at all. The motor 184 is connected by suitable means such as gearing, belts, and similar mechanical systems to one wedge 9 so that as the motor 184 rotates, so does the wedge 9. Assuming that the four input signals when added together at the input to the amplifier 184 have reached a stable condition so that the motor 184 is no longer rotating, then any change in the signal applied to the input terminal 181 from the flight computer 10 to denote a change in heading of the simulated aircraft will unbalance the input to the amplifier 183 and cause it to produce an output signal which is applied to the motor 184. The motor 184 then rotates, driving the wedge 9 and the slide contact 192. Since the two ends of the potentiometer 191 are connected across opposite terminals of a source of electrical potential, and since the center tap of the potentiometer 191 is grounded, motion of the slide contact 192 in either direction away from the center tap applies an increasing positive or negative potential to the input of the amplifier 183, depending upon the direction of the motion. Thus, a change in the potential applied to the input terminal 181 changes the total input applied to the amplifier 183 and the motor 184 rotates until the slide 192 applies a new potential to the input of the amplifier 183 which rebalances the system. When a large change is applied to the input of the amplifier 183, the motor 184 would have a tendency to run away. The tachometer 185 is driven by the motor 184, and its output potential depends upon the speed of rotation. Thus the output from the tachometer 185 increases as the speed of the motor 184 increases, and this tachometer output is in a direction such as to oppose the change in input potential preventing the motor from running away. As the motor 184 rotates to a new position, it also drives the slide 195 on the potentiometer 194. The input to this potentiometer is derived from the potentiometer 211 and the output of this potentiometer taken by the slide 195 is applied as an input to the amplifier 222. Thus, variations in heading also affect the operation of the roll motor 223, since such variations change the roll axis. Each of the other two motor systems 223 and 205 operates in a manner similar to that of the motor system 184.

The above specification has described a new and improved visual training aid for fixed-base vehicle trainers. The system of this invention recognizes the utility and training benefits to be derived from part-time visual training aids. Part-time training aids are those which are not operative during an entire training mission. As examples, this specification has described a visual system which is adapted to operate during simulated take-offs and landings of an aviation trainer. However, the apparatus of this invention can be used for any type of vehicle trainer so long as the basic principles are observed. The motion picture film must have recorded upon it information identifying the speed of the vehicle and the film speed at which the film was exposed. It is clear that others skilled in the art may have suggested to them by a reading of this specification other ways in which the principles of this invention may be used without departing from its spirit. It is, therefore, intended that this invention be limited only by the scope of the appended claims.

What is claimed is:
1. Apparatus to control the rate of frame advancement during playback of a recording medium having recorded thereon a plurality of successive frames containing visual information and additionally having recorded thereon a signal which is frequency modulated, the frequency of said signal having been determined by the velocity at which the device which recorded the frames was moving when the frames were recorded comprising:
   (a) means for advancing the recording medium;
   (b) means to sense the frequency modulated signal;
   (c) means to develop a first signal corresponding to a desired apparent playback velocity;
   (d) means to develop a second signal representing the frame advancement rate of the recording device; and
   (e) means to combine said frequency modulated signal with said first and second signals to provide a drive signal to said advancing means.

2. The invention according to claim 1 wherein said frequency modulated signal is magnetically recorded on said recording medium and said sensing means comprise a magnetic pickup and a frequency detector.

3. The invention according to claim 1 wherein said frequency is equal to a fixed frequency plus a frequency proportional to the velocity of the recording device.

4. The invention according to claim 1 further including means for initiating the operation of said advancing means upon the occurrence of any of several conditions, said initiating means including at least a pair of bistable electrical elements, means for setting each of said bistable elements in response to the occurrence of one of said conditions, means for applying the set output of each of said bistable elements to said advancing means to initiate operation thereof, and means for restoring each of said bistable elements upon the occurrence of another specified condition to halt operation of said advancing means.

5. The invention according to claim 1 wherein said recording medium comprises recordings of more than one environmental condition, and further including means for selecting the operation of said advancing means in accordance with instructional inputs and the environmental condition to be projected, said operation selecting means including trigger devices, means for applying to said trigger devices electrical signals indicative of the occurrence of specified conditions, and means connected to the outputs of said trigger devices for controlling the operation of said advancing means.

6. The invention according to claim 1 wherein said recording medium is a motion picture film with said frequency modulated signal contained on a sound track.

7. The invention according to claim 6 wherein said apparatus is installed in a training device and said advancing means is a film transport in a motion picture projector, said combining means is an amplifier providing a drive signal to said film transport, said sensed signal corresponds to the ground speed of a taking camera, and said desired velocity is the simulated ground speed of said training device.

8. The invention according to claim 7 wherein said freqeuncy modulated signal is amplitude modulated at a point on said motion picture film corresponding to a preselected point on the ground, and further including an amplitude detector connected to an output of said sensing means, coordinate means for developing a position signal corresponding to the desired position of the training device, means for comparing an output of said amplitude detector and said position signal and having an output proportional to the difference therebetween, and means for adding the output of said comparing means to the combined signals, as a correction, to said drive signal.

9. The invention according to claim 8 wherein said comparing means includes a flip-flop circuit having one input connected to the output of said amplitude detector and another input connected to said position signal, said comparing means further including an integrator circuit connected to an output of said flip-flop circuit.

10. The invention according to claim 8 wherein said comparing means includes a pair of flip-flop circuits, a first of said flip-flop circuits having one input thereof connected to said position signal and a second of said flip-flop circuits having one input connected to the output of said amplitude detector, said comparing means further including priority means for connecting said position signal to the other input of said second flip-flop circuit and the output of said amplitude detector to the other input of said first flip-flop circuit, an inverter, and an integrating circuit connected to an output of said first flip-flop circuit through said inverter and to an output of said second flip-flop circuit.

11. The invention according to claim 7 wherein said motion picture is arranged to project said visual information on a screen and further including means for modifying the attitude of the image projected onto the screen, said attitude modifying means including optical elements interposed between said film and said screen, means for changing the optical relationship of said film and said optical elements, and means for applying to said changing means signals representative of the simulated operation of said training device so that the apparent attitude of the image presented changes in accordance with operation of said training device.

12. The invention according to claim 11 wherein said optical elements comprise optical wedges, and means for rotating said wedges in response to electrical signals representative of the simulated attitude of said training device.

13. The invention according to claim 11 and further including means for rotating said projector about its optical axis, and means for applying to said projector rotating means signals representing simulated roll of said training device so that said projector rotates in a direction opposite to that of the simulated roll.

References Cited

UNITED STATES PATENTS

| | | | |
|---|---|---|---|
| 3,261,912 | 7/1966 | Hemstreet | 35—12 N |
| 3,367,046 | 2/1968 | Neuberger | 35—12 N |
| 3,507,993 | 4/1970 | Mulley | 35—12 N |
| 2,843,446 | 7/1958 | Pettus | 179—100.15 |

FOREIGN PATENTS

| | | | |
|---|---|---|---|
| 419,985 | 4/1947 | Italy | 352—92 |

LOUIS R. PRINCE, Primary Examiner

D. E. CORR, Assistant Examiner

U.S. Cl. X.R.

35—12 N